(12) United States Patent  (10) Patent No.: US 6,202,314 B1
Park  (45) Date of Patent: Mar. 20, 2001

(54) CALIBRATION SYSTEM FOR USE WITH MEASURING SYSTEMS

(76) Inventor: Chan Y. Park, 7057 Exeter Dr., Oakland, CA (US) 94611-1519

( * ) Notice: Subject to any disclaimer, the term of this patent is extended or adjusted under 35 U.S.C. 154(b) by 0 days.

(21) Appl. No.: 09/126,633

(22) Filed: Jul. 30, 1998

(51) Int. Cl.$^7$ .............................. G01C 15/06; G01B 11/26
(52) U.S. Cl. .............................. 33/290; 33/286; 33/287; 33/293
(58) Field of Search .............................. 33/290, 292, 293, 33/296, 494, 706, 707, 679.1, 492, 483

(56) References Cited

U.S. PATENT DOCUMENTS

| | | | |
|---|---|---|---|
| 3,970,391 | * | 7/1976 | Johnson et al. .......................... 33/296 |
| 4,196,521 | * | 4/1980 | Hutchinson et al. ................... 33/494 |
| 4,458,425 | * | 7/1984 | Hester ..................................... 33/296 |
| 4,471,532 | * | 9/1984 | Francis ................................... 33/296 |
| 4,718,171 | * | 1/1988 | Schlemmer et al. .................... 33/290 |
| 4,856,997 | * | 8/1989 | Mellecer ................................. 33/290 |
| 5,224,271 | * | 7/1993 | Langford, Jr. et al. ................. 33/290 |
| 5,894,344 | * | 4/1999 | Tamez et al. ........................... 33/293 |
| 6,011,628 | * | 1/2000 | Tullis ...................................... 33/293 |

* cited by examiner

*Primary Examiner*—Christopher W. Fulton
*Assistant Examiner*—Quyen Doan
(74) *Attorney, Agent, or Firm*—James D. Ivey

(57) ABSTRACT

A measuring system includes an optical site reference, such as a reference line within a scope used in surveying, and a calibrated reference scale which provides measurements by optical comparison to the optical site reference. The calibrated reference scale includes centimeter sections which in turn include upper and lower stepped sections. The upper and lower stepped sections are symmetrical with respect to one another such that the upper and lower stepped sections can be easily distinguished from one another from significant distance. Each of the steps of each stepped section indicates a specific, corresponding offset within the stepped section. The symmetry of the upper and lower stepped sections is in the relative positions of the long and short reference members. The calibrated reference scale includes a number of digit reference sections which are spaced a predetermined distance from a reference point along the calibrated reference scale and include an alphanumeric representation of that predetermined distance. The alphanumeric representation has a predetermined height such that the alphanumeric representation itself provides a reference for offsets from a base of the alphanumeric representation. In particular, those alphanumeric representations which have horizontal components place those horizontal components so as to provide relatively evenly spaced references which the digit reference section.

8 Claims, 5 Drawing Sheets

CALIBRATION SYSTEM FOR USE WITH MEASURING SYSTEMS

FIELD OF THE INVENTION

The present invention relates to measurement systems and, in particular, to a particularly effective calibration system for measuring with greater precision when optical comparison to a calibration is used for measuring.

BACKGROUND OF THE INVENTION

Surveying is as old as the art of civil engineering itself and predates even recorded history. One of the primary objectives of surveying is accuracy and precision in measurements made. In measuring an elevation, for example, a calibrated reference is placed at a point of interest while a scope is placed at a second point of reference. The second point of reference, and thus the scope, has a known elevation. The scope is leveled and aimed at the calibrated reference. A horizontal reference line is positioned within the view through the scope such that visual comparison of the reference line as viewed through the scope to the calibrated reference provides a measurement of the difference in elevation between the first and second points of interest.

At times, the distance between the first and second points of reference is considerable and accurate optical comparison between the reference line and the calibrated reference is difficult. For example, conventional calibration systems mark centimeters and perhaps half centimeters such that millimeters are merely estimated by a surveyor. Despite high quality optical magnification within the scope, comparison of the reference line within the scope to marked half-centimeters to estimate a measurement to the nearest millimeter is quite difficult. However, simply marking the calibrated reference with reference marks spaced by one millimeter is ineffective. Specifically, reference marks so close to one another appear as a single, indistinguishable mark from a distance notwithstanding high quality optical magnification.

Another problem with current surveying calibration references is that the view of the scope frequent has insufficient information to make a complete assessment of a current measurement. For example, it is common that only half-centimeter marks of the calibrated reference are visible through the scope at a particular measurement. Such generally requires that the scope be panned up and/or down to view markings which indicate absolute measurements such that the relation between the originally viewed half-centimeter marks and the absolute measurement markings can be determined. Only then can a measurement be made by comparison of the reference line to the half-centimeter marks which would otherwise lack context.

What is needed is a calibration system by which more precise and accurate measurements can be made and by which such measurements can be made without reference to distant portions of a calibrated reference.

SUMMARY OF THE INVENTION

In accordance with the present invention, a measuring system includes an optical site reference, such as a reference line within a scope used in surveying, and a calibrated reference scale which provides measurements by optical comparison to the optical site reference. The calibrated reference scale includes centimeter sections which in turn include upper and lower stepped sections. The upper and lower stepped sections are symmetrical with respect to one another such that the upper and lower stepped sections can be easily distinguished from one another from significant distance. Each of the steps of each stepped section indicates a specific, corresponding offset within the stepped section. In particular, each stepped section includes a long reference section which is adjacent to a short reference section along an adjacent edge of the long reference member. The short reference member is substantially less wide than the long reference member so as to expose a significant portion of the adjacent side. Thus, the exposed portion of the adjacent edge of the long reference member easily visible from significant distances and alignment of the optical site reference with the exposed portion of the adjacent edge can be easily recognized. The symmetry of the upper and lower stepped sections is in the relative positions of the long and short reference members. For example, the long reference member is above the short reference member in the upper stepped section and the long reference member is below the short reference member in the lower stepped section.

The long and short reference members have uniform heights such that edges of the long and short reference members opposite the adjacent edge, as well as the adjacent edge itself, provide references for predetermined offsets within the calibrated reference scale. Some of the advantages of the upper and lower stepped sections are best appreciated in the context of an illustrative example. Consider the lower stepped section in which (i) the bottom, non-adjacent edge of the long reference member is spaced two millimeters from a reference point on the calibrated reference scale, (ii) the height of the long reference member is one millimeter such that the top, adjacent edge of the long reference member is spaced three millimeters from the reference point, and (iii) the height of the short reference member is also one millimeter such that the top, non-adjacent edge of the short reference member is spaced four millimeters from the reference point. In this illustrative example, the top and bottom edges of the long reference member provide two- and three-millimeter references, respectively, relative to the reference point, and the top edge of the short reference member provides a four-millimeter reference relative to the reference point. As a result, references are provided with a precision of one-millimeter. To accomplish references separated by one-millimeter using simple tick marks would either result in marks which are too thin to see from significant distances notwithstanding high-quality optics or in marks which are too close together to distinguish from significant distances. Even if the marks are visible and distinct, determining with which mark the optical siting reference is aligned is difficult since the marks would look similar. Thus, the stepped sections provide references which are close to one another yet are easily recognizable and distinguished, even from significant distance.

Further in accordance with the present invention, the calibrated reference scale includes a number of digit reference sections. A digit reference section is spaced a predetermined distance from a reference point along the calibrated reference scale and includes an alphanumeric representation of that predetermined distance. The alphanumeric representation has a predetermined height such that the alphanumeric representation itself provides a reference for offsets from a base of the alphanumeric representation. In particular, those alphanumeric representations which have horizontal components place those horizontal components so as to provide relatively evenly spaced references which the digit reference section. Such horizontal components have a uniform, predetermined height and are spaced from one another by the same uniform, predetermined height. The following example is illustrative.

A digit reference section whose base is eight centimeters from a reference point along the calibrated reference scale includes an alphanumeric representation of the numeral eight. The digit reference section is one centimeter in height, and the alphanumeric representation is approximately one centimeter in height so as to provide a representation of the entire height of the digit reference section. The alphanumeric representation has top, middle, and bottom horizontal members which define two spaces therebetween, namely, an upper space between the top and middle horizontal members and a lower space between the middle and bottom horizontal members. Each of the horizontal members and the spaces between has a height of two millimeters. Thus, the tops and bottoms of each of the horizontal members and spaces between provides a reference corresponding to an offset within the digit reference section of an even number of millimeters. Similarly, the middles of each of the horizontal members and spaces between provides a reference corresponding to an offset within the digit reference section of an odd number of millimeters.

Thus, in accordance with the present invention, measurements can be determined from significant distances with greater accuracy and precision than can be achieved with conventional measuring systems.

DETAILED DESCRIPTION

In accordance with the present invention, a measuring system includes a calibration system 10 (FIG. 1) which includes digit reference sections which provide simultaneous context information and references for precise offsets within such digit reference section and includes symmetrical upper and lower stepped sections which provide easily recognizable references to very precise offsets within the stepped sections.

Figure 1:
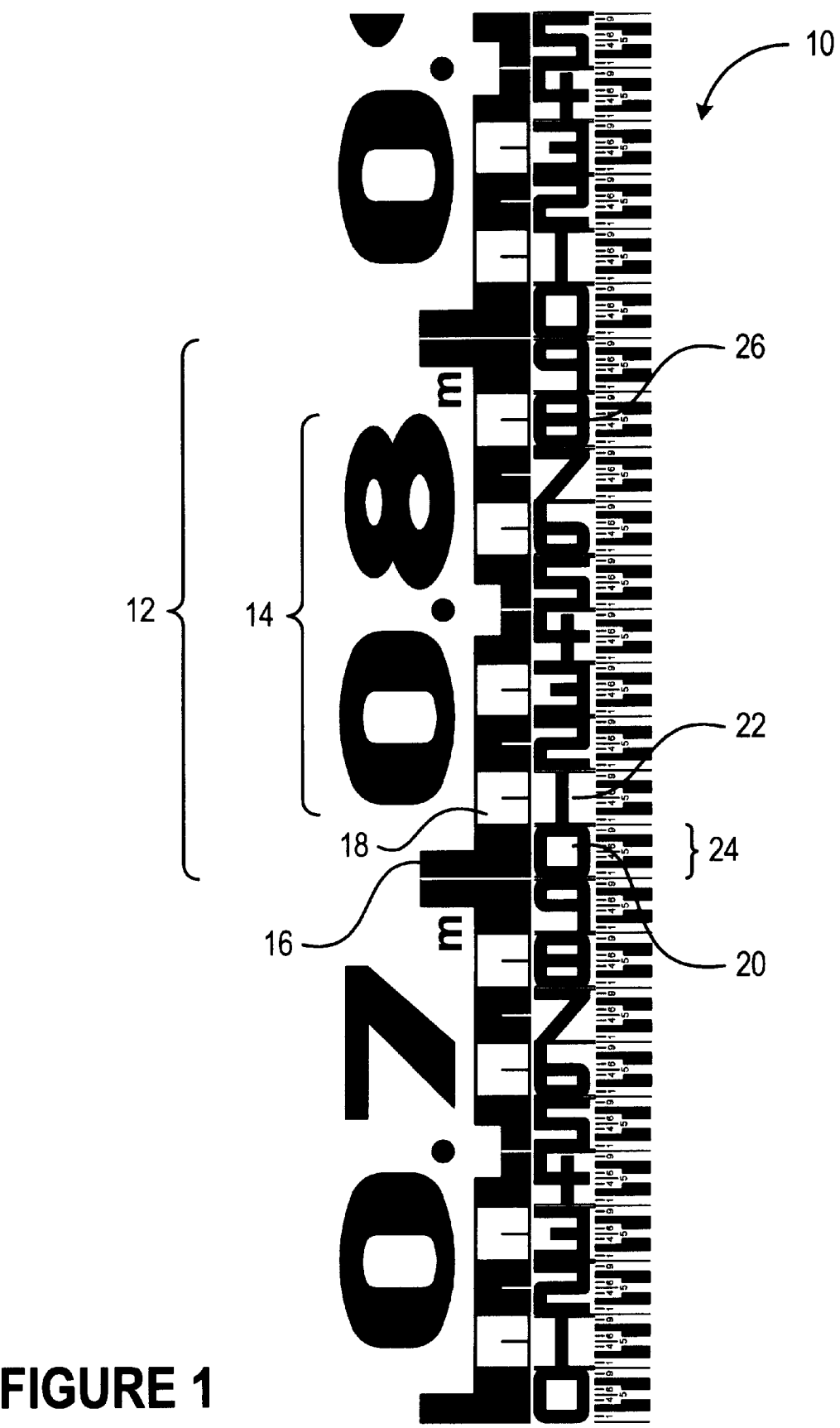
FIG. 1 is an illustration of a calibration system in accordance with the present invention.
Figure 5:
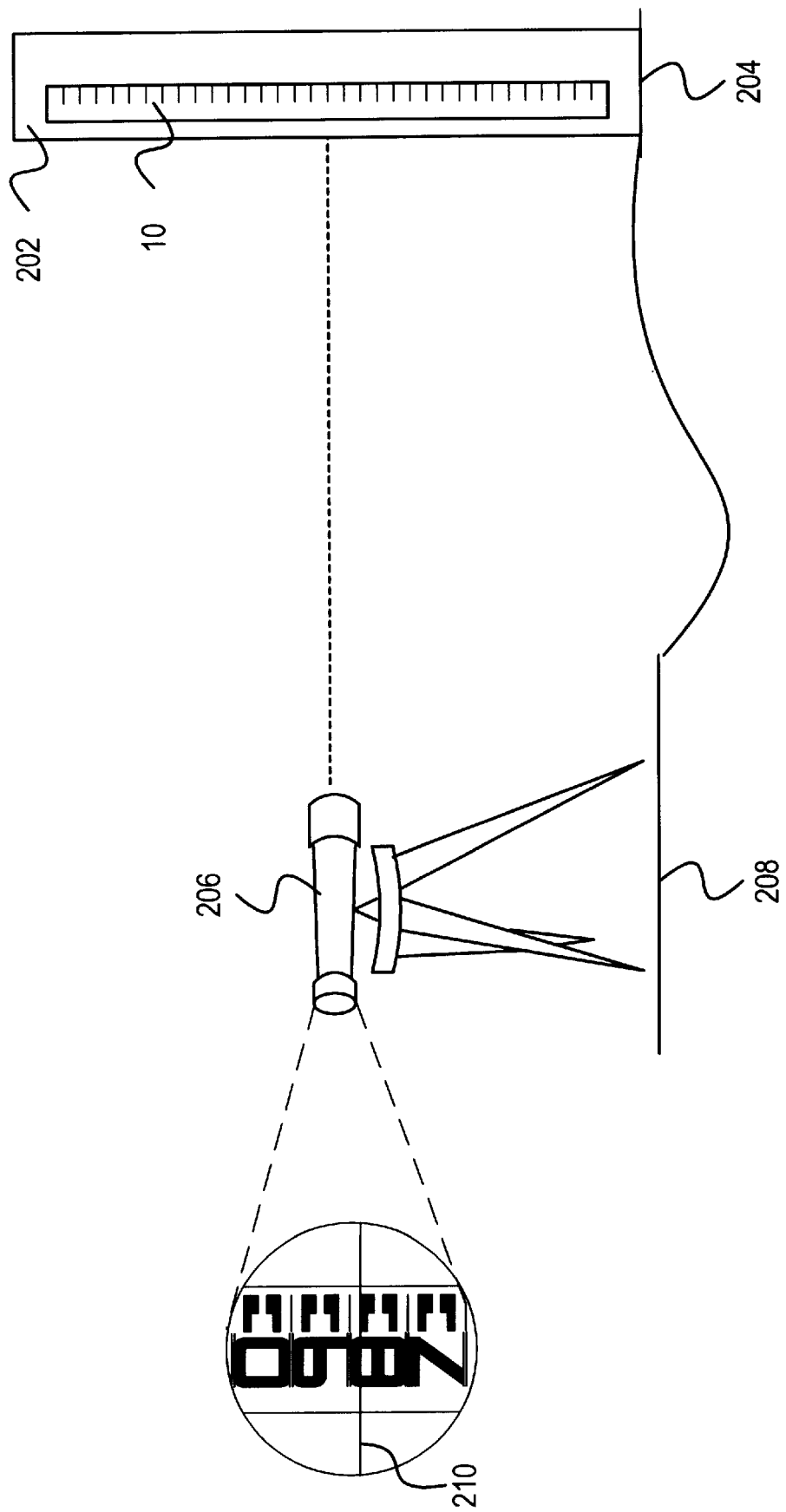
FIG. 5 is an illustration of a measuring system in accordance with the present invention which includes the calibration system of FIG. 1.

FIG. 1 shows a calibration system 10 in accordance with the present invention. Calibration system 10 is mounted on a surface of a flat, rigid, straight object 202 (FIG. 5) such as a pole which is placed in a position of interest 204 in generally the manner described above. In this illustrative example, position of interest 204 has an unknown elevation. In addition, a scope 206 is placed in a second position of interest 208, which has a known elevation in this illustrative example, and is aimed at object 202 calibrated with calibration system 10 such that optical comparison of a reference line 210 within scope 206 to calibration system 10 as positioned on the object. Reference line 210 appears as a horizontal line superimposed upon calibration system 10 as shown in FIG. 5. Optical comparison of reference line 210 with calibration system 10 can be performed by a human surveyor or, alternatively, by an electronic optical recognition systems such as those currently used in robotics.

Calibration system 10 (FIG. 1) includes a number of segmented decimeter portions, such as decimeter portion 12. Decimeter portion 12 includes a numerical representation 14 of an absolute measurement For example, numerical representation 14 indicates an absolute measurement of 0.8 meters.

Decimeter portion 12 also includes ten centimeter portions, e.g., centimeter portions 16 and 18. Each centimeter portion is divided into half-centimeter portions.

In addition to centimeter portions such as centimeter portions 16 and 18, decimeter portion 12 includes digit centimeter portions, e.g., digit centimeter portions 20 and 22, each of which identifies a specific numerical digit between zero and nine. Digit centimeter portions such as digit centimeter portion 20 simultaneously represent a relative measurement in the form of a number of centimeters offset from an edge of decimeter portion 12 and provide a measurement reference. The measurement reference is provided in the form of the height of the represented digit. For example, digit centimeter portion 20 represents the numerical digit, zero, and has a height of one centimeter. Accordingly, if reference line 210 (FIG. 5) within the scope is aligned with the top of digit centimeter portion 20, the measurement is observed as 0.81 meters with 0.8 meters being observed from numerical representation 14 (FIG. 1) and 0.01 meters being observed from the height of digit centimeter portion 20. Since each of the digit centimeter portions represents a numerical digit corresponding to a represented distance relative to the bottom of decimeter portion 12, counting of decimeter portions, e.g., from the top or bottom of decimeter portion 12, is obviated.

Figure 4:
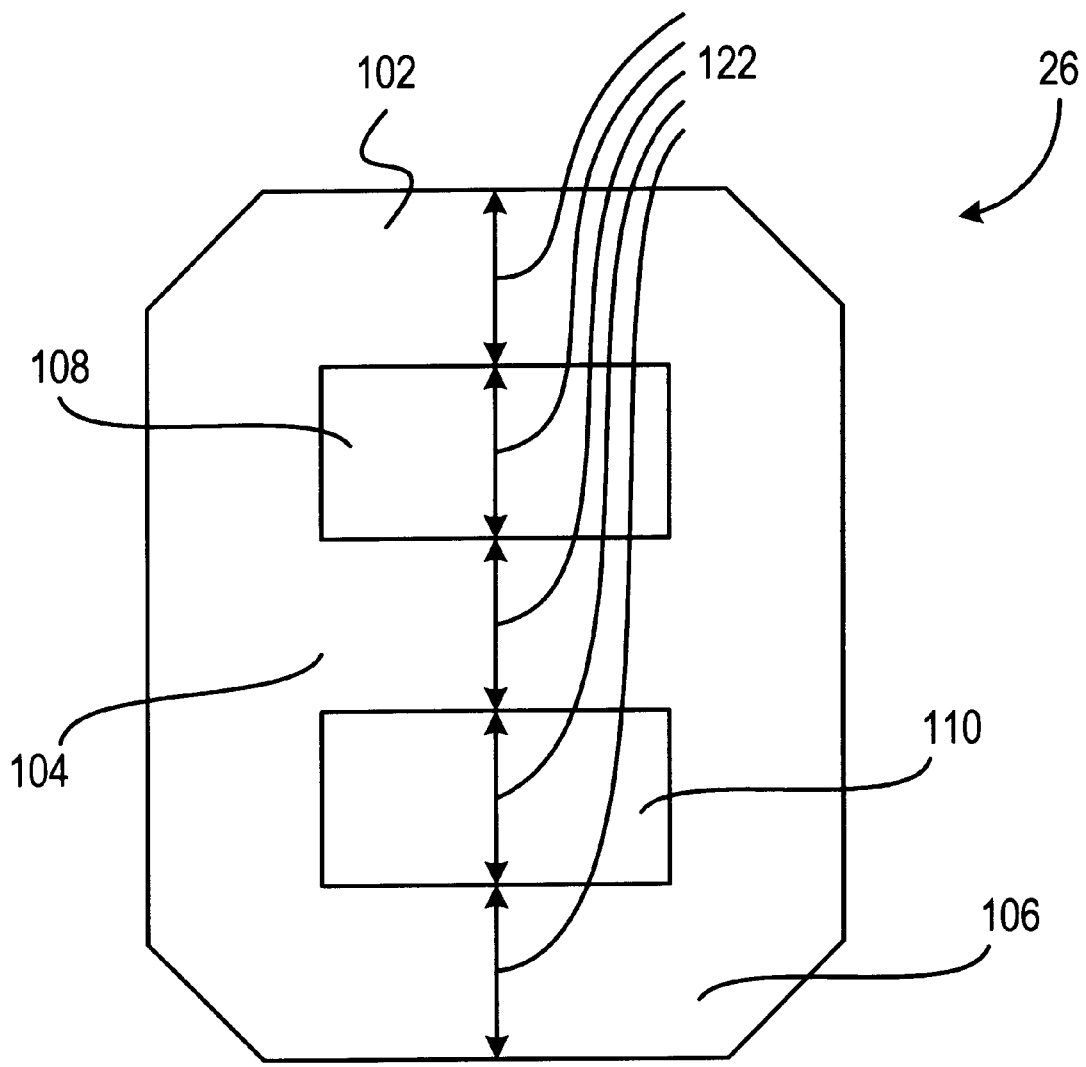
FIG. 4 is a diagram of an alphanumeric representation of a digit centimeter section of the calibration system of FIG. 1.

Furthermore, components of each of the digit centimeter portions are dimensioned to provide more detailed measuring information. Digit centimeter portion 26, which represents the number eight and which represents eight centimeters offset from the bottom of decimeter portion 12, is representative. Digit centimeter portion 26 is shown in isolation in FIG. 4 and includes a top bar 102, a middle bar 104, and a bottom bar 106. Top bar 102 and middle bar 104 define an upper space 108 therebetween. Similarly, middle bar 104 and bottom bar 106 define a lower space 110 therebetween. To further aid in making a precise and accurate measurement, bars 102–106 and spaces 108–110 have a uniform width 122 which is equal to one-fifth of the total height of digit centimeter portion 26. Since digit centimeter portion 26 has a height of one centimeter, width 122 is two millimeters. Accordingly, bars 102–106 and spaces 108–110 can be used to determine a precise offset from the bottom of digit centimeter portion 26. For example, if reference line 210 (FIG. 5) within the scope appears to lie across the center of upper space 108 (FIG. 4), i.e., generally equidistant between top bar 102 and middle bar 104, the measurement is 0.887 meters. This measurement is the sum of (i) 0.8 meters which is determined by reference to numerical representation 14 (FIG. 1); (ii) 0.08 meters which is determined by reference to the numerical representation of digit centimeter portion 26; and (iii) 0.007 meters which is determined by reference to the combined widths of bottom bar 106 (FIG. 4), lower space 110, middle bar 104, and half of upper space 108. Other digit centimeter portions which represent numbers whose representations have top, middle, and/or bottom horizontal bars are positioned analogously to top bar 102, middle bar 104, and bottom bar 106, respectively, to similarly provide more detailed information regarding offsets within such digit centimeter portions.

Figure 2:
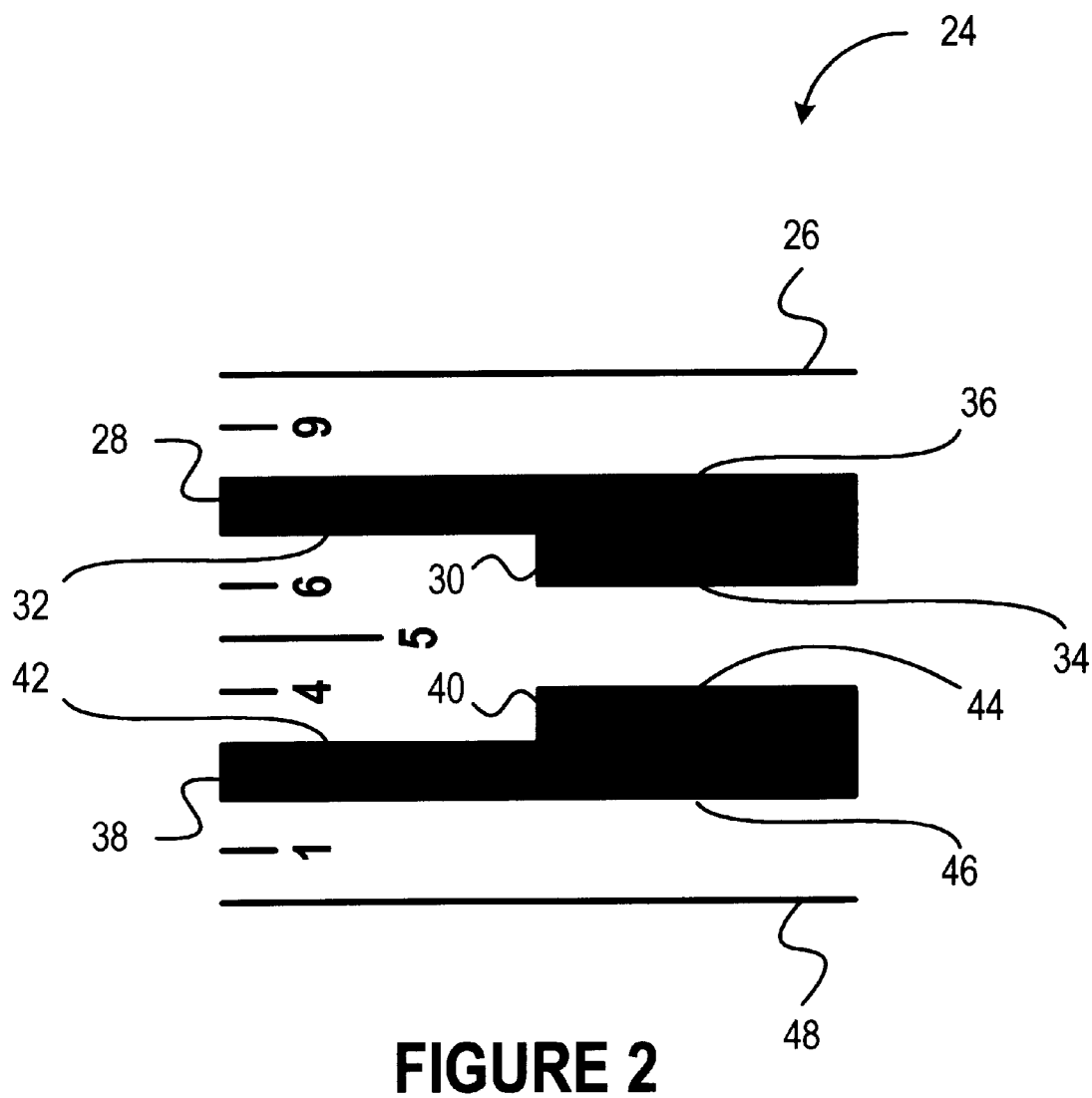
FIG. 2 is a block diagram of a component of the calibration system of FIG. 1.

While digit centimeter portions such as digit centimeter portions 20, 22, and 26 provide reference points for resolutions up to two millimeters and provide a good estimate of single millimeter measurements, greater precision is provided by calibrated centimeter section 24 which is shown in isolation in FIG. 2. Calibrated centimeter section 24 includes a top bar 26 and a bottom bar 48. Alignment of a reference line with top bar 26 indicates a measured offset of one full centimeter from the bottom of calibrated centimeter section 24. While top line 26 may be difficult to see through the scope at times, e.g., when calibration system 10 is placed a significant distance from the scope, alignment between reference line 210 (FIG. 5) and top line 26 (FIG. 2) can be recognized since top line 26 is aligned with the border of digit centimeter portions 20 (FIG. 1) and 22 and that border is relatively easy to perceive, even at significant distances. In addition, calibrated centimeter section 24 (FIG. 2) includes symmetrical stepped sections, one of which is formed by blocks 28 and 30 and a second of which is formed by blocks 38 and 40. The stepped sections are symmetrical about the center of calibrated centimeter section 24 as marked by a long tick mark and the numeral five which in turn represents a five millimeter offset from the bottom of calibrated centimeter section 24.

Specifically, the upper stepped section includes block 28 which is one millimeter in height and equal in width to the full width of calibrated centimeter section 24. In addition, block 30 is adjacent to lower edge 30 of block 28, is one millimeter in height, and has a width equal approximately to one-half of the width of calibrated centimeter section 24. Together, blocks 28 and 30 form the upper stepped section and define three offset positions within calibrated centimeter section 24. Specifically, upper edge 36 of block 28 defines an eight-millimeter offset within calibrated centimeter section 24, i.e., from bottom line 48 which represents a zero-millimeter offset within calibrated centimeter section 24. Lower edge 32 of block 28 extends significantly beyond block 30 to be exposed and recognizable from significant distance. Lower edge 32 defines a seven-millimeter offset within calibrated centimeter section 24. Lower edge 34 of block 30 defines a six-millimeter offset within calibrated centimeter section 24. Edges 36, 32, and 34 are quite different in appearance and are therefore easily distinguishable from one another, even at great distances. As a result, recognition of any numerical reference is generally unnecessary to accurately identify six-, seven-, and eight-millimeter offsets within calibrated centimeter section 24.

The lower stepped section is symmetric with the upper stepped section and includes blocks 38 and 40. Block 38 is one millimeter in height and equal in width to the full width of calibrated centimeter section 24. Block 40 is adjacent to upper edge 42 of block 38, is one millimeter in height, and has a width equal approximately to one-half of the width of calibrated centimeter section 24. Lower edge 46 of block 38 defines a two-millimeter offset within calibrated centimeter section 24. Upper edge 42 of block 38 defines a three-millimeter offset within calibrated centimeter section 24. Upper edge 44 of block 40 defines a four-millimeter offset within calibrated centimeter section 24. As described above with respect to edges 36, 32, and 34, edges 46, 42, and 44 are quite different in appearance and are therefore easily distinguishable from one another, even at great distances. As a result, recognition of any numerical reference is generally unnecessary to accurately identify two-, three-, and four-millimeter offsets within calibrated centimeter section 24.

Furthermore, the upper stepped section of blocks 28 and 30 have an appearance which is distinct from the lower stepped section of blocks 38 and 40. The upper and lower stepped sections are therefore readily distinguished from one another, even a significant distance. For example, a reference line which is aligned at a border between a short block, e.g., either of blocks 30 and 40, and a long block, e.g., either of blocks 28 and 38, indicates either a three-millimeter offset or a seven-millimeter offset. Due to the distinct appearances of the upper and lower stepped section, these two are easily distinguished. If the shorter block is above the longer block, reference line 210 (FIG. 5) is aligned with upper edge 42 (FIG. 2) of block 38 and a three-millimeter offset is indicated. Conversely, if the shorter block is below the longer block, reference line 210 (FIG. 5) is aligned with lower edge 32 (FIG. 2) of block 28 and a seven-millimeter offset is indicated.

Lower edge 34 of block 30 and upper edge 44 of block 40 are separated by two millimeters. A reference line which appears between and generally equally distant from edges 34 and 44 indicates a five-millimeter offset within calibrated centimeter section 24. Edges 34 and 44 are easily recognizable as described above.

Bottom line 48 represents a zero-millimeter offset within calibrated centimeter section 24. Bottom line 48 is easily recognized as bottom line 48 is aligned with edges of centimeter portions such as centimeter portion 16 (FIG. 1) and digit centimeter portion 20. In addition, bottom line 48 is displaced from lower edge 46 by two millimeters such that a reference line which appears above bottom line 48 and below lower edge 46 of block 38 indicates a one-millimeter offset into calibrated centimeter portion 24.

Top line 26 represents a ten-millimeter offset within calibrated centimeter section 24. Top line 26 is easily recognized as bottom line 48 is aligned with edges of centimeter portions in generally the manner described above with respect to bottom line 48. In addition, top line 26 is displaced from upper edge 36 by two millimeters such that a reference line which appears below top line 26 and above upper edge 36 of block 28 indicates a nine-millimeter offset into calibrated centimeter portion 24.

Thus, calibrated centimeter section 24 can be used to measure accurately with a precision of one millimeter.

Figure 3:
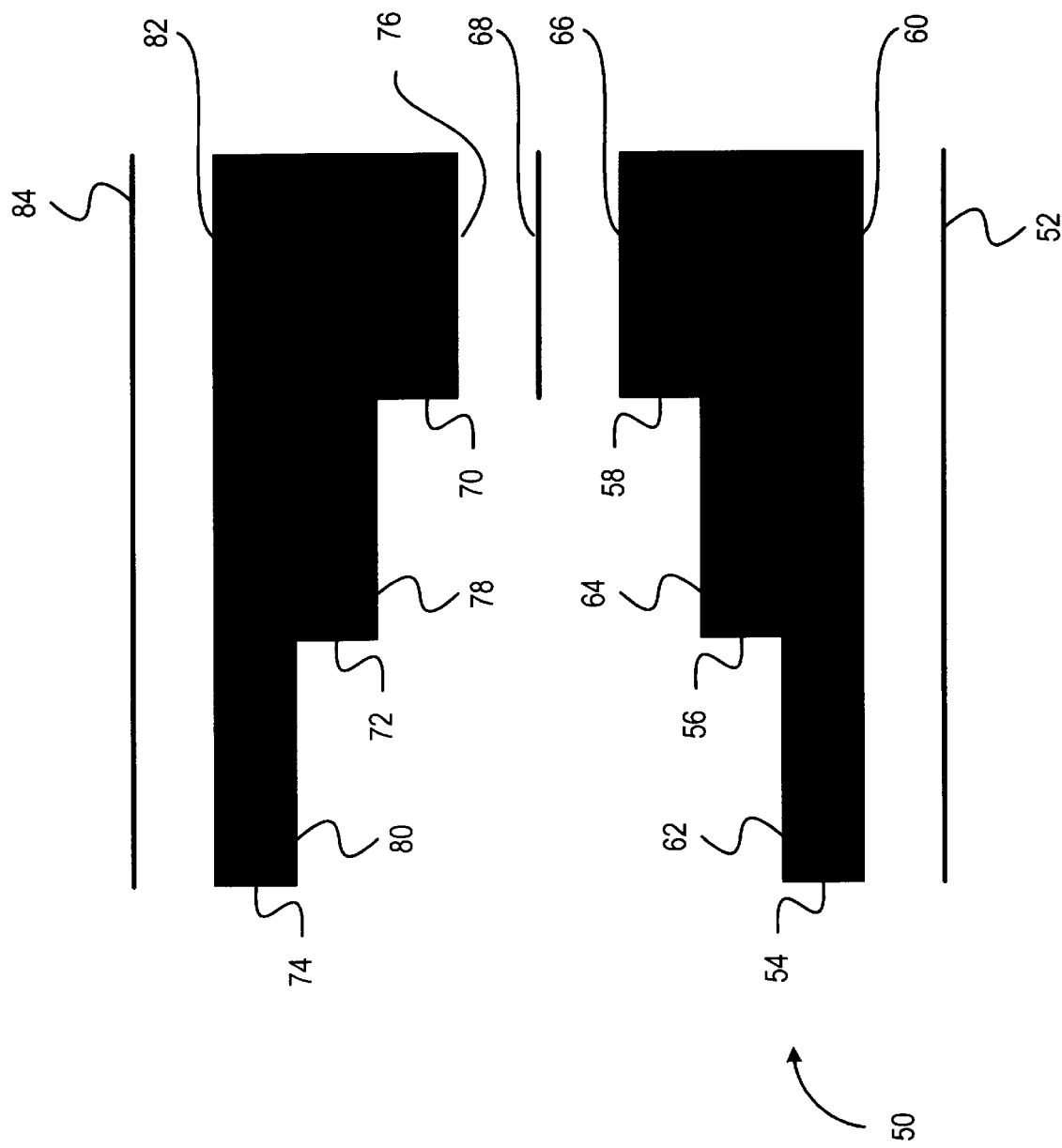
FIG. 3 is a block diagram of an alternative to the component of FIG. 2.

An alternative to calibrated centimeter section 24 is shown in FIG. 3. Tenth-inch section 50 provides accurate measurements with a precision of one-hundredth of an inch. Tenth-inch section 50 includes a bottom line 52 and a top line 84 which are generally analogous to bottom 48 (FIG. 2) and top line 26, respectively, of calibrated centimeter section 24. In addition, tenth-inch section 50 (FIG. 3) includes a lower stepped section which includes blocks 54, 56, and 58 and an upper stepped section which includes blocks 70, 72, and 74. Block 54 is one-hundredth of an inch high and has a bottom edge 60 which is one-hundredth of an inch from bottom line 52. Accordingly, upper edge 62 of block 52 represents an offset of two-hundredths of an inch from bottom line 52. Block 54 is equal in width to tenth-inch section 50.

Block 56 is adjacent to block 54 at upper edge 62 and is significantly less wide that block 54. In one embodiment, block 56 has a width which is approximately two-thirds the width of tenth-inch section 50. Thus, a significant portion of upper edge 62 is exposed, i.e., is not adjacent to block 56. Upper edge 62 is therefore easily recognizable from considerable distance and therefore provides a good reference for a two-hundredth inch offset within tenth-inch section 50.

Similarly, block 58 is adjacent to block 56 at upper edge 64 and is significantly less wide that block 56. In one embodiment, block 58 has a width which is approximately one-third the width of tenth-inch section 50. Thus, a significant portion of upper edge 64 is exposed, i.e., is not adjacent to block 58. Upper edge 64 is therefore easily recognizable from considerable distance and therefore provides a good reference for a three-hundredth inch offset within tenth-inch section 50.

Upper edge 66 of block 58 provides a reference for a four-hundredth inch offset within tenth-inch section 50. Blocks 70, 72, and 74 are substantially equal in dimension to blocks 58, 56, and 54, respectively, and are adjacent to one another to form an upper stepped section as shown. In particular, block 74 is substantially equal in width to tenth-hundredth section 50 and is one-hundredth of an inch in height. Upper edge 82 is fully exposed, i.e., not adjacent to any other block, and provides a reference for a nine-hundredth inch offset within tenth-inch section 50. A significant portion of lower edge 80 is exposed to provide a reference for an eight-hundredth inch offset within tenth-inch section 50. Block 72 is adjacent to block 74 at lower edge 80 and is substantially less wide than block 74. In one embodiment, block 72 has a width which is approximately two-thirds of the width of tenth-inch section 50. Block 72 has a height of one-hundredth of an inch, as do all of blocks 54, 56, 58, 70, 72, and 74. Block 70 is adjacent to lower edge 78 of block 72 but is substantially less wide than block 72 so that a significant portion of lower edge 78 is exposed. In one embodiment, block 70 has a width which is approximately one-third the width of tenth-inch section 50. Lower edge 78 is therefore easily recognizable from considerable distance and provides a reference to a seven-hundredth inch offset within tenth-inch section 50. Lower edge 76 of block 70 is fully exposed and provides a reference for a six-hundredth inch offset within tenth-inch section 50.

A five-hundredth inch offset within tenth-inch section 50 is marked by a bar 68 midway between upper edge 66 of block 58 and lower edge 76 of block 70. A ten-hundredth inch offset within tenth-inch section 50 is marked by a top bar 84 which is one-hundredth of an inch above upper edge 82 of block 74. Thus, tenth-inch section 50 provides accurate measurements with a precision of one-hundredth of an inch which are optically recognizable from substantial distances.

The above description is illustrative only and is not limiting. The present invention is limited only by the claims which follow.

What is claimed is:

1. A measuring system comprising:
   an optical siting reference;
   a calibrated scale for comparison to the optical siting reference, the calibrated scale including:
      a first stepped section which includes:
         a first long reference member which has a first length; and
         a first short reference member which is adjacent to the first long reference member along a first adjacent side of the first long reference member and which has a second length which in turn is substantially less than the first length so as to expose a significant portion of the first adjacent side of the first long reference member;
      a second stepped section which includes:
         a second long reference member which has the first length; and
         a second short reference member which is adjacent to the second long reference member along a second adjacent side of the second long reference member and which has the second length so as to expose a significant portion of the second adjacent side of the second long reference member;
      wherein arrangement of the first long and short reference members of the first stepped section relative to one another is different than arrangement of the second long and short reference members of the second stepped section relative to one another;
   wherein measurement is determined according to alignment of the optical siting reference with edges of reference members of the calibrated scale.

2. The measuring system of claim 1 wherein the arrangement of the first long and short reference members relative to one another is symmetrical with respect to the arrangement of the second long and short reference members relative to one another.

3. The measuring system of claim 1 wherein the first adjacent side is a lower side of the first long reference member; and
   further wherein the second adjacent side is an upper side of the second reference member.

4. The measuring system of claim 1 wherein the first long and short reference members and the second long and short reference members all have substantially the same height.

5. The measuring system of claim 4 wherein the same height is an elementary unit of measurement.

6. The measuring system of claim 5 wherein the elementary unit of measurement is a millimeter.

7. The measuring system of claim 5 wherein the elementary unit of measurement is a hundredth inch.

8. The measuring system of claim 1 wherein the first stepped section further includes:
   a first shorter reference member which is adjacent to the first short reference member along a third adjacent side of the first short reference member and which has a third length which in turn is substantially less than the second length so as to expose a significant portion of the third adjacent side of the first short reference member;
   further wherein the second stepped section further includes:
      a second shorter reference member which is adjacent to the second short reference member along a fourth adjacent side of the second short reference member and which has the third length so as to expose a significant portion of the fourth adjacent side of the second short reference member.

* * * * *